(12) United States Patent
Kumagai

(10) Patent No.: US 12,426,748 B2
(45) Date of Patent: Sep. 30, 2025

(54) SEALING DEVICE FOR SEALING AN OPENING OF A BAG-SHAPED FILM BODY

(71) Applicant: NIHONSAFETY CO., LTD., Tokyo (JP)

(72) Inventor: Tsukasa Kumagai, Tokyo (JP)

(73) Assignee: NIHONSAFETY CO., LTD., Tokyo (JP)

( * ) Notice: Subject to any disclaimer, the term of this patent is extended or adjusted under 35 U.S.C. 154(b) by 456 days.

(21) Appl. No.: 17/858,961

(22) Filed: Jul. 6, 2022

(65) Prior Publication Data

US 2023/0007955 A1    Jan. 12, 2023

(30) Foreign Application Priority Data

Jul. 7, 2021  (JP) .................................. 2021-113133

(51) Int. Cl.
    *A47K 11/02*      (2006.01)
    *A47K 11/04*      (2006.01)
    (Continued)

(52) U.S. Cl.
    CPC ............ *A47K 11/026* (2013.01); *A47K 11/04* (2013.01); *A47K 11/06* (2013.01); *B65D 33/22* (2013.01)

(58) Field of Classification Search
    CPC ................. B65B 51/146; B65B 51/148; B65F 2210/167; A47K 11/026
    (Continued)

(56) References Cited

U.S. PATENT DOCUMENTS 3,401,409 A * 9/1968 Ekrut .................. A47K 11/026
                                                        4/484
3,416,164 A * 12/1968 Ekrut .................... A47K 11/02
                                                        4/484
(Continued)

FOREIGN PATENT DOCUMENTS

JP          54-68482 U      5/1979
JP          61-90902 A      5/1986
            (Continued)

OTHER PUBLICATIONS

Notice of Refusal dated Jul. 2, 2024 issued in corresponding Japanese Patent Application No. 2021-113133, with English language machine translation thereof.
(Continued)

*Primary Examiner* — Stephen F. Gerrity
(74) *Attorney, Agent, or Firm* — SQUIRE PATTON BOGGS (US) LLP

(57) ABSTRACT

A sealing device includes a frame member having an opening portion, an engaging portion with which a first portion of the bag-shaped film body is engaged, and a heater unit; a moving member having an attaching portion to which a second portion of the bag-shaped film body is attached and a heater receiving portion; and a handle member that is slidably inserted in the frame member and coupled to the moving member. The moving member is arranged so as to be movable in the opening portion toward the engaging portion, and the heater unit and the heater receiving portion are configured to clamp the bag-shaped film body and heat and seal it in a state in which the moving member is moved to the vicinity of the engaging portion by the handle member.

6 Claims, 9 Drawing Sheets

(51) Int. Cl.
*A47K 11/06* (2006.01)
*B65D 33/22* (2006.01)

(58) Field of Classification Search
USPC .............................. 53/479, 284.7; 4/483, 484
See application file for complete search history.

(56) References Cited

U.S. PATENT DOCUMENTS

| | | | | | |
|---|---|---|---|---|---|
| 3,473,779 | A | * | 10/1969 | Gustafson et al. | .. A47K 11/026 |
| | | | | | 4/471 |
| 4,324,088 | A | * | 4/1982 | Yamashita et al. | ... B65F 1/1431 |
| | | | | | 4/484 |

FOREIGN PATENT DOCUMENTS

| | | | |
|---|---|---|---|
| JP | 11-77855 A | | 3/1999 |
| JP | 2001292928 A | * | 10/2001 |
| JP | 2004-175508 A | | 6/2004 |
| JP | 2017-136179 A | | 8/2017 |
| KR | 10-2116804 B1 | | 5/2020 |

OTHER PUBLICATIONS

Notice of Preliminary Rejection dated Jul. 29, 2024 issued in corresponding Korean Patent Application No. 10-2022-0084015, with English language translation thereof.

* cited by examiner (a)

SEALING DEVICE FOR SEALING AN OPENING OF A BAG-SHAPED FILM BODY

TECHNICAL FIELD

The present invention relates to a sealing device that seals a resin film and relates also to a bag-shaped film body to be sealed by the sealing device.

BACKGROUND ART

As a device for treating waste such as human excrement, used diapers, and swill disposal, a sealing device is known, which is configured to contain the waste in a tubular resin film and seal it by heat sealing. For example, Patent Document 1 discloses a toilet apparatus including a film sealing device that feeds a tubular resin film using a feed roller driven by a motor and heat-seals the opening of the film in a state of containing excrement and the like.

PRIOR ART DOCUMENTS

Patent Documents

[Patent Document 1] JP2017-136179A

SUMMARY OF THE INVENTION

Problems to be Solved by the Invention

The toilet apparatus disclosed in Patent Document 1 uses a tubular resin film as the resin film for containing the waste and is configured to continuously feed the tubular resin film by repeatedly sealing and cutting the film. To continuously feed the film containing the waste in this way, the sealing device is required to repeat the operation of feeding out the film, but in order to feed out the film, the sealing device has to include a roller, a motor for driving the roller, and a control unit or the like that controls the motor. The sealing device including such a drive system and a control system, however, has a problem in that the structure is inevitably complicated and the repair and maintenance become troublesome. Another problem is that the downsizing and weight reduction of the device are hindered due to the complicated structure, and still another problem is that the production cost increases due to the increase in the number of constitutional members.

The present invention has been made in view of the above problems, and an object of the present invention is to provide a sealing device capable of sealing a bag-shaped film body containing waste and the like while having a simple structure. Another object of the present invention is to provide a bag-shaped film body having a structure suitable for being sealed by the sealing device.

Means for Solving the Problems

To achieve the above objects, first, the present invention provides a sealing device that seals an opening of a bag-shaped film body, the sealing device comprising: a frame member having an opening portion through which the bag-shaped film body is inserted, an engaging portion with which a first portion of the bag-shaped film body at an end edge portion of the opening is engaged, and a heater unit provided in a vicinity of the engaging portion; a moving member having an attaching portion to which a second portion of the bag-shaped film body at a position opposing to the first portion at the end edge portion of the opening is attached and a heater receiving portion provided in a vicinity of the attaching portion; and a handle member that is slidably inserted in the frame member and coupled to the moving member, wherein the moving member is arranged so as to be movable in the opening portion toward the engaging portion, and the heater unit and the heater receiving portion are configured to clamp the bag-shaped film body and heat and seal it in a state in which the moving member is moved to the vicinity of the engaging portion by the handle member (Invention 1).

According to the invention (Invention 1), in a state in which the bag-shaped film body is inserted through the opening portion of the frame member, a part of the end edge portion of the opening of the bag-shaped film body is engaged with the engaging portion of the frame member while another part of the bag-shaped film body at a position opposing to the engaging portion is attached to the attaching portion of the moving member, and the moving member to which the other part of the bag-shaped film body is attached can be moved toward the engaging portion by the handle member. By moving the moving member toward the engaging portion, the end edge portion of the opening of the bag-shaped film body converges while being folded, and the folded bag-shaped film body is clamped between the heater unit provided in the vicinity of the engaging portion in the frame member and the heater receiving portion provided in the vicinity of the attaching portion in the moving member. In this state, the bag-shaped film body can be sealed by heating. Such a sealing device can reliably seal the bag-shaped film body containing waste and the like even with a simple structure that is easy to repair and maintain.

In the above invention (Invention 1), the sealing device may include a pair of right and left pushing members that push, toward the center of the opening portion, a third portion and a fourth portion between the first portion and the second portion of the bag-shaped film body at the end edge portion of the opening in conjunction with movement of the moving member toward the engaging portion (Invention 2).

According to the invention (Invention 2), when the moving member is moved toward the engaging portion, the pushing members push the side portions of the end edge portion of the opening of the bag-shaped film body from the right and left toward the center of the opening, so that the vicinity of the opening of the bag-shaped film body converges while being reliably folded, and the folded bag-shaped film body is clamped between the heater unit and the heater receiving portion without protruding outside.

In the above invention (any one of Inventions 1 and 2), the handle member may include a pair of right and left rod-shaped portions arranged in parallel and a grip portion provided astride between end portions of the pair of right and left rod-shaped portions, and the pair of right and left rod-shaped portions may be slidably inserted in a pair of insertion portions provided on the right and left of the opening portion of the frame member (Invention 3).

According to the invention (Invention 3), the handle member does not interfere with the opening portion of the frame member, and the moving member can be coupled to the rod-shaped portions from both the right and left sides; therefore, the moving member can be smoothly moved by operation of the handle member.

In the above invention (Invention 3), each of the pair of right and left rod-shaped portions may have a rod portion connected to the grip portion and a base end portion coupled to the moving member, the rod portion may be axially attached to the base end portion so as to be movable in a tilting manner, and the heater unit may be configured to come to a heating state when the rod portion is tilted to a predetermined position with respect to the base end portion in a state of being pulled out from each of the insertion portions (Invention 4).

According to the invention (Invention 4), heating by the heater unit is started only when the rod portion is tilted with respect to the base end portion after the moving member is moved by the handle member and the folded bag-shaped film body is clamped between the heater unit and the heater receiving portion, and the safety during the sealing work can therefore be ensured.

In the above invention (any one of Inventions 1 to 4), an air evacuation member having a contact surface that comes into contact with the bag-shaped film body may be suspended from the moving member (Invention 5).

According to the invention (Invention 5), as the moving member moves, the air evacuation member moves in a state in which the contact surface is pressed against the bag-shaped film body; therefore, the air in the bag-shaped film body is pushed out from the opening, and it is possible to prevent the bag-shaped film body from inflating with air when the opening is sealed.

In the above invention (Invention 5), the contact surface may have a convex shape protruding toward the engaging portion (Invention 6).

According to the invention (Invention 6), the air in the bag-shaped film body can be pushed out from the opening more efficiently.

In the above invention (any one of Inventions 5 and 6), the air evacuation member may be swingably suspended from the moving member so as not to restrict movement of the moving member toward the engaging portion (Invention 7).

According to the invention (Invention 7), even if the air evacuation member hits the waste and the like contained in the bag-shaped film body while the moving member is moving toward the engaging portion, the moving member is not restricted to move further toward the engaging portion because the air evacuation member is configured to be swingable with respect to the moving member. That is, it is prevented that the moving member cannot move on the way due to the interference of the air evacuation member with the waste and the like contained in the bag-shaped film body.

In the above invention (any one of Inventions 1 to 7), heater receiving portion guide plates may be provided below both end portions of the heater receiving portion so as to guide the bag-shaped film body from the both end portions of the heater receiving portion toward a central portion of the heater receiving portion, and/or heater unit guide plates may be provided below both end portions of the heater unit so as to guide the bag-shaped film body from the both end portions of the heater unit toward a central portion of the heater unit (Invention 8).

According to the invention (Invention 8), the heater receiving portion guide plates and/or the heater unit guide plates prevent the end edge portion of the opening of the bag-shaped film body, which is being folded as the moving member moves, from protruding outside the welding width obtained by the heater receiving portion and the heater unit.

Second, the present invention provides a bag-shaped film body including a plate member formed in a polygonal annular shape in a plan view and provided around an end edge portion of an opening, wherein the plate member is formed by coupling a plurality of strip-shaped plate portions together at a plurality of foldable portions (Invention 9).

According to the invention (Invention 9), by attaching the plate member to the end edge portion of the opening of the bag-shaped film body, force for moving or pushing from outside is applied to the plate member, so that the end edge portion of the opening of the bag-shaped film body can be folded easily and smoothly.

In the above invention (Invention 9), the plate member may have six plate portions of a first plate portion, a second plate portion, a third plate portion, a fourth plate portion, a fifth plate portion, and a sixth plate portion in this order, and the six plate portions may be coupled at six foldable portions (Invention 10).

In the above invention (Invention 10), the six foldable portions may be a first foldable portion, a second foldable portion, a third foldable portion, a fourth foldable portion, a fifth foldable portion, and a sixth foldable portion that are arranged in this order from the first foldable portion between the first plate portion and the second plate portion, the first foldable portion, the third foldable portion, the fourth foldable portion, and the sixth foldable portion may be formed so as to be easily folded outward the opening, and the second foldable portion and the fifth foldable portion may be formed so as to be easily folded inward the opening (Invention 11).

According to the invention (Invention 11), the plate member can be folded so that the second plate portion, the third plate portion, the sixth plate portion, and the fifth plate portion overlap together in this order from the first plate portion side between the first plate portion and the fourth plate portion; therefore, by applying the force for moving or pushing from outside to the plate member, the end edge portion of the opening of the bag-shaped film body can be folded easily and smoothly.

In the above invention (Invention 11), the second plate portion and the fifth plate portion may each be provided with an auxiliary foldable portion formed in the vicinity of the center in the longitudinal direction so as to be easily folded outward the opening (Invention 12).

According to the invention (Invention 12), in the process of folding the plate member, the second plate portion and the fifth plate portion are folded in the vicinities of the centers so as to be folded outward the opening, and the plate member can thereby be folded more smoothly so that the second plate portion, the third plate portion, the sixth plate portion, and the fifth plate portion overlap together in this order from the first plate portion side between the first plate portion and the fourth plate portion.

In the above invention (any one of Inventions 10 to 12), when the bag-shaped film body is attached to the sealing device according to any one of Inventions 1 to 8, the first plate portion may be preferably attached to the moving member as the first portion, and the fourth plate portion may be preferably attached to the engaging portion as the second portion (Invention 13).

In the above invention (any one of Inventions 9 to 13), the plate member may be preferably made of paper, and the foldable portions may be preferably formed by paper creasing (Invention 14).

Advantageous Effect of the Invention

According to the sealing device of the present invention, the bag-shaped film body containing waste can be sealed even with a simple structure. Moreover, according to the present invention, it is possible to provide a bag body having a structure suitable for being sealed by the sealing device.

EMBODIMENTS FOR CARRYING OUT THE INVENTION

Figure 1A:
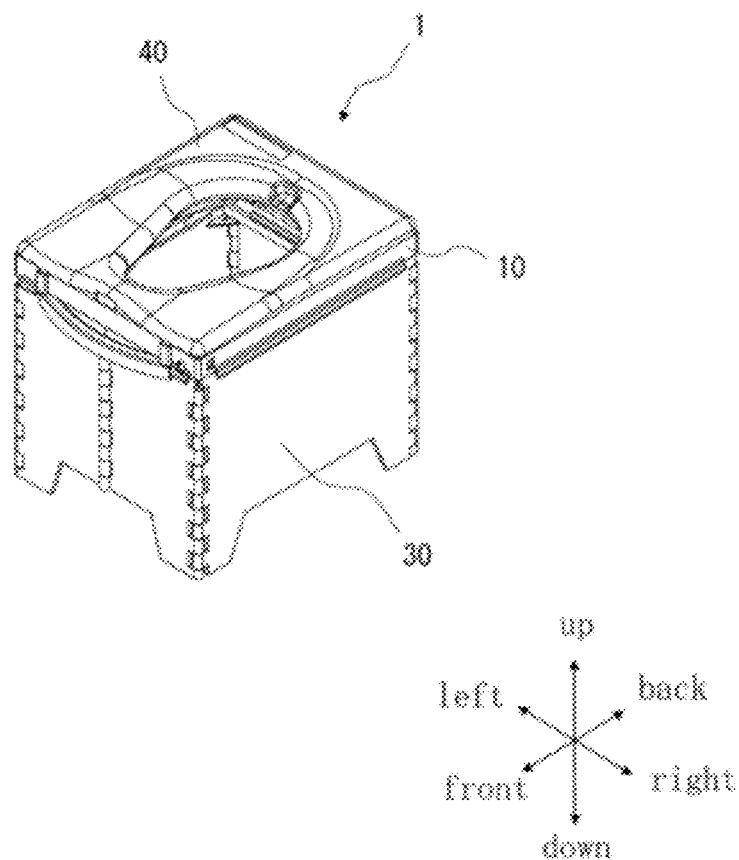
FIGS. 1A and 1B are a set of explanatory diagrams illustrating the structure of a toilet apparatus including a sealing device according to an embodiment of the present invention.
Figure 1B:
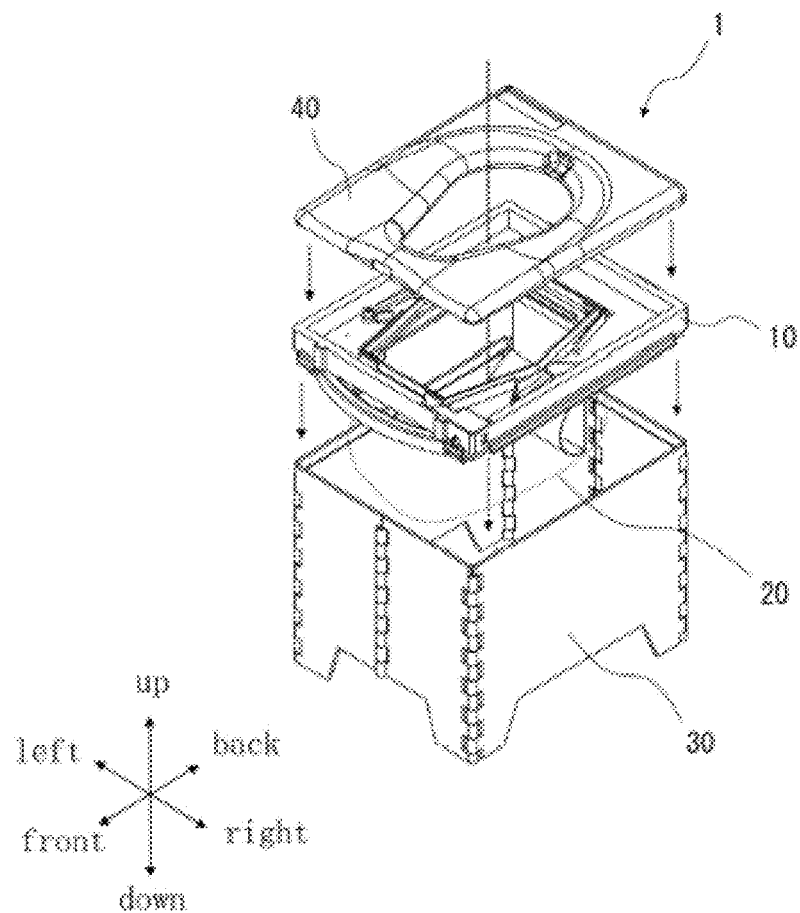

Hereinafter, one or more embodiments of the present invention will be described with reference to the drawings. FIGS. 1A and 1B are a set of explanatory diagrams illustrating the structure of a toilet apparatus 1 including a sealing device 10 according to an embodiment of the present invention, wherein FIG. 1A illustrates the appearance of the assembled toilet apparatus 1 and FIG. 1B illustrates the disassembled state. It should be noted that the present invention is not limited only to the embodiments described below, and the embodiments are merely examples described for explaining the technical features of the present invention. It is also noted that the shapes and dimensions indicated in the drawings are illustrated only for the purpose of facilitating the understanding of the content of the present invention and may not accurately reflect the actual shapes and dimensions.

The directional definition of the up-down, front-rear, and right-left directions in the present invention is based on the state when the toilet apparatus 1 and the sealing device 10 are used and is specifically as follows. First, in the toilet apparatus 1, the side on which a toilet seat 40 is disposed is referred to as "up or upper," and the side on which a pedestal 30 is disposed is referred to as "down or lower." In the sealing device 10 constituting the toilet apparatus 1, the side on which a grip portion 130 of a handle member 13 described later is disposed is referred to as "front," and the opposite side thereof is referred to as "rear." In a state in which the sealing device 10 is viewed from the front (a state facing the grip portion 130), the right side direction is referred to as "right" and the left side direction is referred to as "left." In FIGS. 1A and 1B, arrows indicating the up-down, front-rear, and right-left directions are illustrated in accordance with the above directional definition.

<Toilet Apparatus>

As illustrated in FIGS. 1A and 1B, the sealing device 10 of the present embodiment is one of the constitutional components constituting the toilet apparatus 1 together with the pedestal 30 and the toilet seat 40. In the toilet apparatus 1, human excrement may be contained in a bag-shaped film body 20 attached to the sealing device 10, and the sealing device 10 heat-seals an opening of the bag-shaped film body 20. The toilet apparatus 1 is configured such that the sealing device 10, the pedestal 30, and the toilet seat 40 can be easily disassembled/assembled. The toilet apparatus 1 can be used by being placed beside a bed in a hospital, a nursing care site, an accommodation facility, or the like. Alternatively, the toilet apparatus 1 can be used as a toilet that is easily installed, for example, during a disaster, when an event is held, etc.

The pedestal 30 may have a rectangular parallelepiped shape whose upper portion and bottom portion are opened, and may be formed so as to be foldable by coupling six plate-shaped members. The sealing device 10 is placed on the upper portion of the pedestal 30 and fixed to the upper end edge portion of the pedestal 30 in an attachable and detachable manner. The toilet seat 40 on which the user of the toilet apparatus s 1 sits is attached to the upper portion of the sealing device 10 placed on the pedestal 30.

<Bag-Shaped Film Body>

Figure 2:
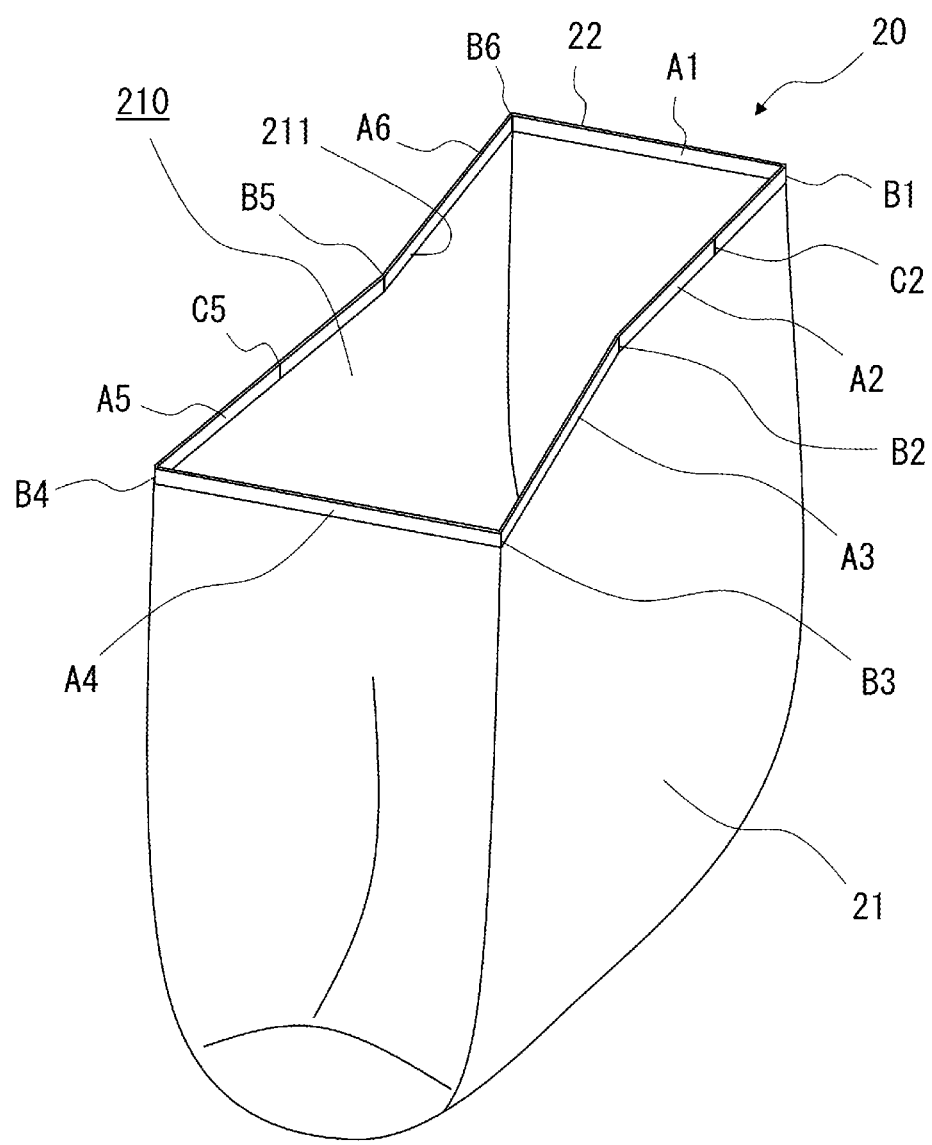
FIG. 2 is an explanatory diagram illustrating the structure of a bag-shaped film body to be sealed by the sealing device.

FIG. 2 is an explanatory diagram illustrating the structure of the bag-shaped film body 20 to be sealed by the sealing device 10. The bag-shaped film body 20 used by being attached to the sealing device 10 of the present embodiment may be configured such that a plate member 22 formed in a polygonal annular shape in a plan view is provided around an end edge portion 211 of an opening 210 of a resin bag main body 21. The plate member 22 may be formed by coupling a plurality of strip-shaped plate portions together at a plurality of foldable portions. Specifically, the plate member 22 has six plate portions of a first plate portion A1, a second plate portion A2, a third plate portion A3, a fourth plate portion A4, a fifth plate portion A5, and a sixth plate in order in the clockwise direction in FIG. 2, and the six plate portions are coupled together at six foldable portions (B1, B2, B3, B4, B5, and B6). The six foldable portions are a first foldable portion B1, a second foldable portion B2, a third foldable portion B3, a fourth foldable portion B4, a fifth foldable portion B5, and a sixth foldable portion B6 that are arranged in this order from the first foldable portion B1 between the first plate portion A1 and the second plate portion A2.

The material constituting the bag main body 21 is not particularly limited, provided that it can be heat-sealed by a heater unit 114 of the sealing device 10, which will be described later. Examples of the material include thermoplastic resins, particularly thermoplastic resins having a low melting point and high hot workability, such as polyethylene and polypropylene. Various known methods can be used to attach the plate member 22 to the bag main body 21. For example, the plate member 22 may be adhered by an adhesive, may be attached by using a fastener such as a stapler, or the end edge portion 211 of the opening 210 of the bag main body 21 may be folded back to form a loop and the plate member 22 may be inserted through the loop.

The material constituting the plate member 22 is not particularly limited, provided that the plate member 22 is formed of a material that maintains its shape even when a certain amount of external force is applied at least at room temperature, such as paper, resin, metal, wood, stone, glass, fiber, or the like, but considering that the bag-shaped film body 20 contains waste such as excrement and is discarded, the material may be preferably made of paper or resin, and particularly preferably made of paper that allows a plurality of foldable portions to be easily formed by paper creasing.

In the present embodiment, the plate member 22 is made of paper and formed in a polygonal annular shape in a plan view by coupling both end portions of one long strip-shaped thick paper. The first foldable portion B1, the third foldable portion B3, the fourth foldable portion B4, and the sixth foldable portion B6 of the plate member 22 may be formed by paper creasing so as to be easily folded outward the opening 210, and the second foldable portion B2 and the fifth foldable portion B5 may be formed by paper creasing so as to be easily folded inward the opening 210.

Additionally, or alternatively, the second plate portion A2 may be formed with a second plate auxiliary foldable portion C2 near the center in the longitudinal direction by paper creasing so as to be easily folded outward the opening 210, and the fifth plate portion A5 may be formed with a fifth plate auxiliary foldable portion C5 near the center in the longitudinal direction by paper creasing so as to be easily folded outward the opening 210.

In the bag-shaped 20 of the present embodiment, by attaching the plate member 22 to the end edge portion 211 of the opening 210 of the bag-shaped film body 20, the force for moving or pushing from outside is applied to the plate member 22, so that the end edge portion 211 of the opening 210 of the bag-shaped film body 20 can be folded easily and smoothly.

<Sealing Device>

Figure 3A:
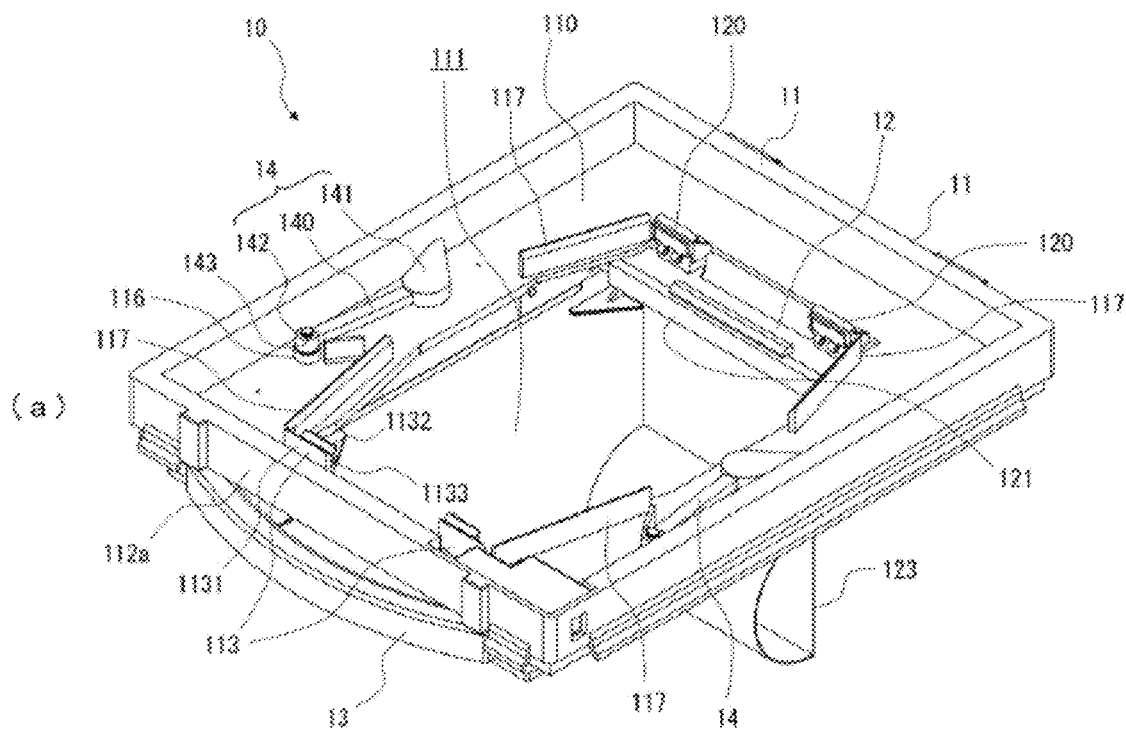
FIGS. 3A and 3B are a set of explanatory diagrams illustrating the overall configuration of the sealing device.
Figure 3B:
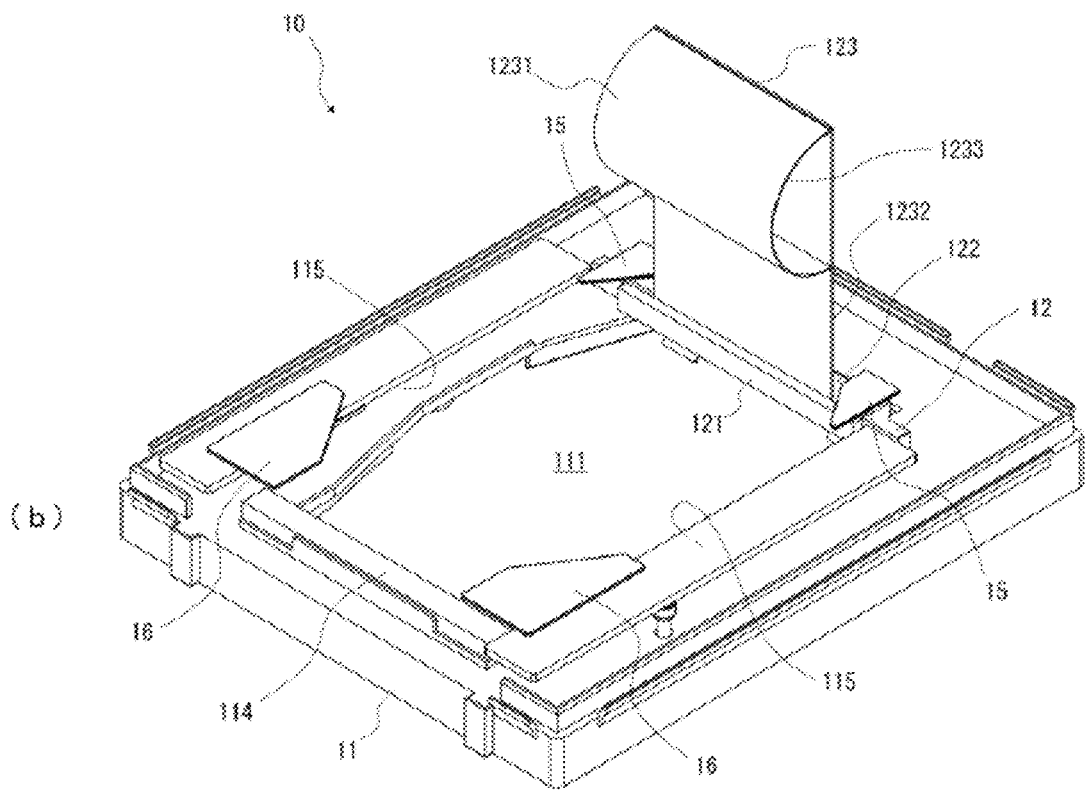

FIGS. 3A and 3B are a set of explanatory diagrams illustrating the overall structure of the sealing device 10, wherein FIG. 3A is a perspective diagram of the sealing device 10 as viewed from the upper side (top side) and FIG. 3B is a perspective diagram of the sealing device 10 as viewed from the lower side (back side). The sealing device is a sealing device that seals the opening of a bag-shaped film body such as a vinyl bag, and includes a frame member 11, a moving member 12, a handle member 13, and a pair of right and left pushing members 14. For easy understanding of the structure, FIG. 3B illustrates a state in which the handle member 13 is removed from the sealing device 10.

The frame member 11 has an approximately rectangular outer shape and includes a flat plate-shaped frame bottom 110 formed with an opening portion 111 at the central portion through which the bag-shaped film body 20 is inserted and a side wall portion 112 provided to stand on the peripheral edge portion of the frame bottom 110. The opening portion 111 has a shape/size corresponding to the toilet seat 40 attached to the upper portion of the sealing device 10. In the present embodiment, the opening portion 111 is formed in an approximately barrel-like polygonal shape in a plan view. The shape and size of the opening portion 111 are not particularly limited, provided that excrement and the like can be thrown in from above, and the shape may be, for example, a rectangular shape, a circular shape, an elliptical shape, or the like in a plan view.

The front side edge portion of the opening portion 111 is formed with an engaging portion with which the first plate portion A1 of the bag-shaped film body 20 is engaged (as a first portion of the bag-shaped film body 20 at the end edge portion 211 of the opening 210). The engaging portion is composed of two clamping members 113. The two clamping members 113 are attached to a front side wall portion 112a of the frame member 11 at an interval so as to be able to clamp respective both end portions of the first plate portion A1 of the bag-shaped film body 20. Each of the clamping members 113 is a member having a U-shaped cross section in which an engaging groove 1133 is formed between two plate-shaped portions 1131 and 1132. The width of the engaging groove 1133 is approximately equal to the thickness of the first plate portion A1 of the bag-shaped film body 20. Such a structure allows the first plate portion A1 of the bag-shaped film body 20 to be engaged with the clamping members 113 (engaging portion) by inserting the first plate portion A1 into the engaging groove 1133.

The heater unit 114 is provided in the vicinity of the clamping members 113 (engaging portion), specifically, on the front side wall portion 112a of the frame member 11 below the positions at which the clamping members 113 are attached. The heater unit 114 in the present embodiment includes a heating surface (not illustrated) toward the opening portion 111. The heating surface incorporates a linear heater wire (not illustrated). The bag-shaped film body 20 is heated by the heater unit 114 in a state in which the bag-shaped film body 20 is clamped between the heating surface and a heater receiving portion 121 of the moving member 12, which will be described later. The heated portion is heat-welded, and the bag-shaped film body 20 is sealed by using the heat welding.

As illustrated in FIG. 3B, a pair of insertion portions 115 are provided on the right and left of the opening portion 111 of the frame member 11. The insertion portions 115 are each formed in a U-shaped cross section in which the surface facing the opening portion 111 is open, and rod-shaped members 131 of the handle member 13, which will be described later, are slidably inserted in the insertion portions 115. (FIG. 3B illustrates a state in which the handle member 13 is removed.) The shape of the insertion portions 115 is not particularly limited, provided that the rod-shaped members 131 of the handle member 13 can be slidably inserted in the insertion portions 115 and the inserted rod-shaped members 131 do not fall off from the frame member 11. For example, each of the insertion portions 115 may be formed in a tubular shape or may also be formed by attaching to the frame member a groove-shaped rail member to which a part of each rod-shaped member 131 fits.

The moving member 12 is arranged so as to be movable in the opening portion 111 of the frame member 11 toward the engaging portion composed of the two clamping members 113, that is, toward the front side wall portion 112a of the frame member 11. The moving member 12 can be moved in the opening portion 111 of the frame member 11 by operating the handle member 13, which will be described later.

Figure 4:
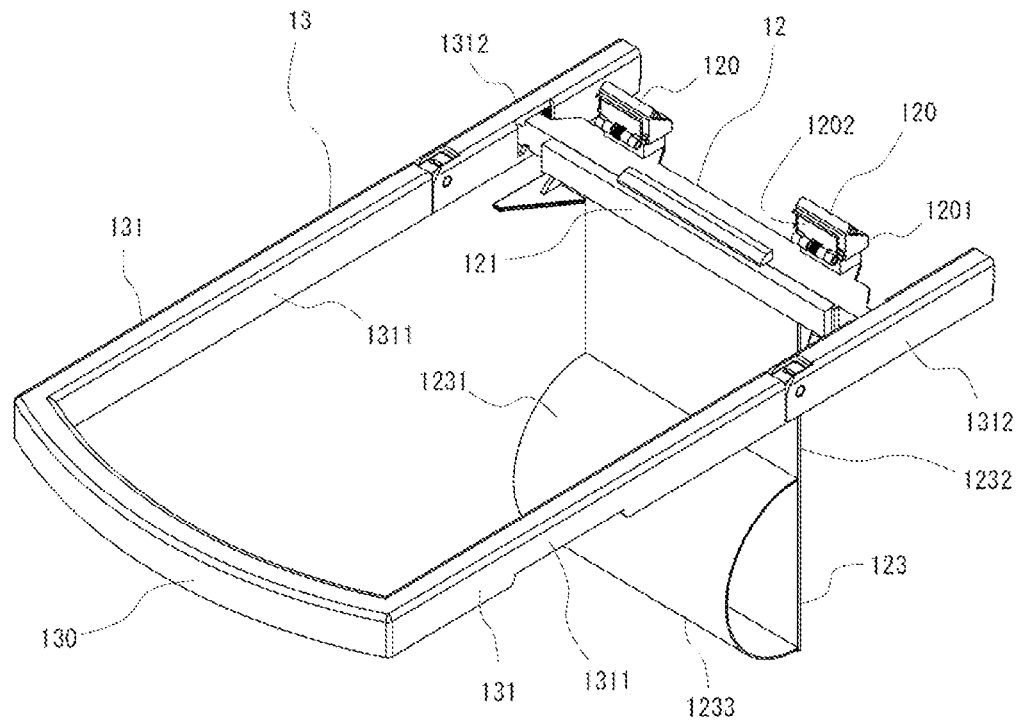
FIG. 4 is an explanatory diagram illustrating the structures of a handle member and a moving member of the sealing device.

As illustrated in FIG. 4, an attaching portion composed of two clip members 120 is attached to the upper portion of the moving member 12. The fourth plate portion A4 of the bag-shaped film body 20 is attached (as a second portion of the bag-shaped film body 20 at a position opposing to the first portion at the end edge portion 211 of the opening 210) to the attaching portion. The two clip members 120 are attached to the upper portion of the moving member 2 at an interval so as to be able to clamp respective both end portions of the fourth plate portion A4 of the bag-shaped film body 20. Each of the clip members 120 is a member configured such that a movable plate portion 1202 is attached to a block-shaped base portion 1201 by using a spring hinge, and the movable plate portion 1202 is in a state of being pressed against the base portion 1201 by the biasing force of the spring hinge.

Such a structure allows the fourth plate portion A4 of the bag-shaped film body 20 to be attached to the clip members 120 (attaching portion) by inserting the fourth plate portion A4 between the base portion 1201 and the movable plate portion 1202. Moreover, when the bag-shaped film body 20 after being sealed is pulled, the movable plate portion 1202 moves in a direction away from the base portion 1201, and the fourth plate portion A4 is disengaged from between the base portion 1201 and the movable plate portion 1202; therefore, the bag-shaped film body 20 can be smoothly removed from the moving member 12.

In the moving member 12, the heater receiving portion 121 is provided in the vicinity of the clip members 120 (attaching portion), specifically, at a position below the positions at which the clip members 120 are attached and opposing to the heater unit 114 provided on the frame member 11. The heater receiving portion 121 has a length commensurate with the length of the heater unit 114, and as the moving member 12 moves in the opening portion 210 toward the front side wall portion 112a of the frame member 11 (i.e., toward the engaging portion composed of the two clamping members 113), the heater receiving portion 121 provided on the moving member 12 comes into contact with the heating surface of the heater unit 114 provided on the frame member 11.

An air evacuation member 123 having a contact surface 1231 that comes into contact with the bag-shaped film body 20 attached to the sealing device 10 is suspended from a bottom portion 122 of the moving member 12. The air evacuation member 123 in the present embodiment includes a rectangular flat plate member 1232 and a semi-cylindrical contact member 1233 for forming the contact surface 1231. The contact member 1233 is disposed on one of the two surfaces of the flat plate member 1232, that is, a surface (front surface) toward the engaging portion (clamping members 113) provided on the frame member 11. Such a structure allows the contact surface 1231 of the air evacuation member 1231 to have a convex shape protruding toward the engaging portion (clamping members 113) provided on the frame member 11. The shape of the contact member 1233 is not particularly limited, provided that it has a convex shape protruding at least in one direction, and may be, for example, a triangular cylinder shape or a square cylinder shape.

By suspending such an air evacuation member 123, as the moving member 12 moves, the air evacuation member 123 moves in a state in which the contact surface 1231 is pressed against the bag-shaped film body 20; therefore, the air in the bag-shaped film body 20 is pushed out from the opening 210, and it is possible to prevent the bag-shaped film body 20 from being inflated by the air when sealing the opening 210. In particular, the contact surface 1231 has a convex shape protruding toward the engaging portion (clamping members 113), and it is thereby possible to more efficiently push out the air in the bag-shaped film body 20 from the opening 210.

The air evacuation member 123 may be swingably suspended from the moving member 12 so as not to restrict the movement of the moving member 12 toward the engaging portion (clamping members 113) provided on the frame member 11. Specifically, by attaching the flat plate member 1232 of the air evacuation member 123 to the bottom portion 122 of the moving member 12 using a hinge, the air evacuation member 123 is swingably suspended from the moving member 12. Thus, by suspending the air evacuation member 123, even if the air evacuation member 123 hits the waste and the like contained in the bag-shaped film body 20 while the moving member 12 is moving toward the engaging portion (clamping members 113), the moving member 12 is not restricted to move further toward the engaging portion (clamping members 113) because the air evacuation member 123 is configured to be swingable with respect to the moving member 12. That is, it is prevented that the moving member 12 cannot move on the way due to the interference of the air evacuation member 123 with the waste and the like contained in the bag-shaped film body 20.

The handle member 13 is slidably inserted in the frame member 11 and coupled to the moving member 12. As illustrated in FIG. 4, the handle member 13 includes a pair of right and left rod-shaped members 131 arranged in parallel and a grip portion 130 provided astride between end portions of the pair of right and left rod-shaped members 131. The pair of right and left rod-shaped members 131 are slidably inserted in a pair of insertion portions 115 provided on the right and left of the opening portion 111 of the frame member 11. By configuring the handle member 13 in this way, the handle member 13 does not interfere with the opening portion 111 of the frame member 11, and the moving member 12 can be coupled to the rod-shaped members 131 from both the right and left sides; therefore, the moving member 12 can be smoothly moved by the operation of the handle member 13.

Each of the pair of right and left rod-shaped members 131 has a rod portion 1311 connected to the grip portion 130 and a base end portion 1312 coupled to the moving member 12. The rod portion 1311 is axially attached to the base end portion 1312 so as to be movable in a tilting manner. The heater unit 114 is configured to come to a heating state when the rod portion 1311 is tilted to a predetermined position with respect to the base end portion 1312 in a state of being pulled out from each of the insertion portions 115, for example, when the rod portion 1311 is tilted to a position at which the rod portion is raised 90 degrees with respect to the base end portion 1312.

The pair of right and left pushing members 14 are provided on the frame bottom 110 of the frame member 11. More specifically, the pushing members 14 are provided symmetrically on both sides of the opening portion 111 in the frame bottom 110 so as to interpose the opening portion 111. The pair of right and left pushing members 14 push, toward the center of the opening portion 111, the plate member 22, which is provided around the end edge portion 211 of the opening 210 of the bag-shaped film body 20 attached to the sealing device 10, in conjunction with the movement of the moving member 12 toward the engaging portion (clamping members 113) provided on the frame member 11 of the moving member 12.

Each of the pushing members 14 is configured such that a droplet-shaped pushing portion 141 in a plan view is formed at one end of a rod-shaped shaft portion 140 and a cylindrical shaft support portion 142 is formed at the other end of the shaft portion 140. In this structure, the shaft support portion 142 is axially attached, using a shaft member 143, to a support portion 116 provided on the frame bottom 110 of the frame member 11, and the pushing portion 141 can thereby move toward the center of the opening portion 111 while the shaft support portion 142 and the shaft member 143 serve as an axis of rotation. The shaft member 143 moves in conjunction with the slide movement of each rod-shaped member 131 of the handle member 13, and the slide movement of the rod-shaped member 131 of the handle member 13 allows the moving member 12 to move toward the engaging portion (clamping members 113) provided on the frame member 11; therefore, that is to say, the pair of right and left pushing members 14 move conjunction with the movement of the moving member 12 toward the engaging portion (clamping members 113) provided on the frame member 11.

When the pushing portions 141 move toward the center of the opening portion 111, the pushing portion 141 of the left-side pushing member 14 pushes, toward the center of the opening portion 111, the second plate portion A2 and third plate portion A3 (as a third portion) between the first plate portion A1 (as the first portion) and the fourth plate portion A4 (as the second portion) of the plate member 22 provided around the end edge portion 211 of the opening 210 of the bag-shaped film body 20 attached to the sealing device 10, while the pushing portion 141 of the right-side pushing member 14 pushes, toward the center of the opening portion 111, the fifth plate portion A5 and sixth plate portion A6 (as a fourth portion) between the first plate portion A1 (as the first portion) and the fourth plate portion A4 (as the second portion). Thus, by providing the pair of right and left pushing members 14, when the moving member 12 is moved toward the engaging portion (clamping members 113), the pushing members 14 push the side portions of the end edge portion 211 of the opening 210 of the bag-shaped film body 20 from the right and left toward the center of the opening portion 111; therefore, the vicinity of the opening 210 of the bag-shaped film body 20 converges while being reliably folded, and the folded bag-shaped film body 20 is clamped between the heater unit 114 and the heater receiving portion 121 without protruding outside.

As illustrated in FIG. 3B, heater receiving portion guide plates 15 are provided below both end portions of the heater receiving portion 121 of the moving member 12 so as to guide the bag-shaped film body 20 from the both end portions of the heater receiving portion 121 toward the central portion of the heater receiving portion 121. Each of the heater receiving portion guide plates 15 is a plate-shaped member having an approximately trapezoidal shape in a plan view, and two heater receiving portion guide plates 15 are provided in a bilaterally symmetric form. The two heater receiving portion guide plates 15 are attached to the moving member 12 so that the distance between the two gradually decreases and the oblique sides are in the directions from both end portions of the heater receiving portion 121 toward the central portion and in the direction toward the heater unit 114.

Additionally, or alternatively, as illustrated in FIG. 3B, heater unit guide plates 16 are provided below both end portions of the heater unit 114 so as to guide the bag-shaped film body 20 from the both end portions of the heater unit 114 toward the central portion of the heater unit 114. Each of the heater unit guide plates 16 is a plate-shaped member having an approximately trapezoidal shape in a plan view, and two heater unit guide plates 16 are provided in a bilaterally symmetric form. The two heater unit guide plates 16 are attached to the frame member 11 so that the distance between the two gradually decreases and the oblique sides are in the directions from both end portions of the heater unit 114 toward the central portion and in the direction toward the heater receiving portion 121.

When the waste is contained in the bag-shaped film body 20 attached to the sealing device 10, the bag-shaped film body 20 is suspended from the opening portion 111 of the sealing device 10 in a stretched state due to the weight of the waste; therefore, if the moving member 12 is moved in this state, the bag-shaped film body 20 is reliably guided toward the central portion of the heater receiving portion 121 by the two heater receiving portion guide plates 15 and also reliably guided toward the central portion of the heater unit 114 by the two heater unit guide plates 16. When the sealing device 10 includes at least one of the set of the heater receiving portion guide plates 15 and the set of the heater unit guide plates 16, the bag-shaped film body 20 is introduced toward the central portion of the heater unit 114 in the process in which the bag-shaped film body 20 is being clamped between the heater unit 114 and the heater receiving portion 121, but when the sealing device 10 includes both the set of the heater receiving portion guide plates 15 and the set of the heater unit guide plates 16, the bag-shaped film body 20 is more reliably introduced toward the central portion of the heater unit 114. This can prevent the end edge portion 211 of the opening 210 of the bag-shaped film body 20, which is being folded as the moving member 12 moves, from protruding outside the welding width obtained by the heater receiving portion 121 and the heater unit 114.

As illustrated FIG. 3A, guide walls 117 are provided to stand in the vicinities of the four corners of the opening portion 111 of the frame member 11. The guide walls 117 prevent the plate member 22 of the bag-shaped film body 20 attached to the sealing device 10 from escaping to the outside in the process of folding the plate member 22.

Figure 5:
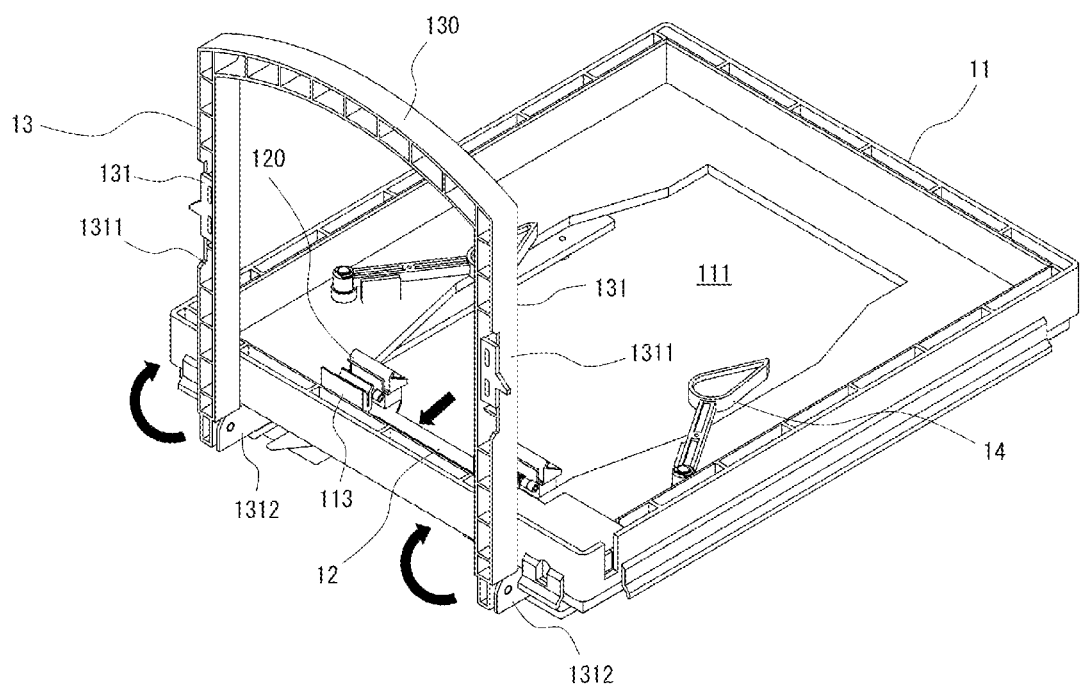
FIG. 5 is an explanatory diagram illustrating a state in which the handle member of the sealing device is operated for heat sealing.

In the present embodiment, the heater unit 114 and the heater receiving portion 121 are configured to clamp the bag-shaped film body 20 and heat and seal it in a state in which the moving member 12 is moved to the vicinity of the engaging portion (clamping members 113) by the handle member 13. More specifically, the heater unit 114 is configured to come to a heating state when the rod portion 1311 of the handle member 13 is tilted to a position at which the rod portion 1311 is raised 90 degrees with respect to the base end portion 1312, as illustrated in FIG. 5, in a state of being pulled out from each of the insertion portions 115. With such a configuration, heating by the heater unit 114 is started only when the rod portion 1311 is tilted with respect to the base end portion 1312 after the moving member 12 is moved by the handle member 13 and the folded bag-shaped film body 20 is clamped between the heater unit 114 and the heater receiving portion 121, and the safety during the sealing work can therefore be ensured.

The mechanism for sealing the bag-shaped film body 20 is not limited to such a structure. For example, a detection device (sensor) may be provided to detect that the moving member 12 has moved to a predetermined position (the folded bag-shaped film body 20 has been clamped between the heater unit and 114 the heater receiving portion 121), and the heater unit 114 may be configured to start heating when the detection device outputs a detection signal. Additionally, or alternatively, a switch for controlling the On/Off of the heating start by the unit 114 may be provided.

According to the sealing device 10 described above, in a state in which the bag-shaped film body 20 is inserted through the opening portion 111 of the frame member 11, a part of the end edge portion 211 of the opening 210 of the bag-shaped film body 20 is engaged with the engaging portion (clamping members 113) of the frame member 11 while another part of the bag-shaped film body 20 at a position opposing to the engaging portion is attached to the attaching portion (clip members 120) of the moving member 12, and the moving member 12 to which the other part of the bag-shaped film body 20 is attached can be moved toward the engaging portion (clamping members 113) by the handle member 13. By moving the moving member 12 toward the engaging portion (clamping members 113), the end edge portion 211 of the opening 210 of the bag-shaped film body 20 converges while being folded, and the folded bag-shaped film body 20 is clamped between the heater unit 114 provided in the vicinity of the engaging portion (clamping members 113) in the frame member 11 and the heater receiving portion 121 provided in t the vicinity of the attaching portion (clip members 120) in the moving member 120. In this state, the bag-shaped film body 20 can be sealed by heating. Such a sealing device 10 can reliably seal the bag-shaped film body 20 containing waste and the like even with a simple structure that is easy to repair and maintain.

<Flow of Sealing Bag-Shaped Film Body>

Hereinafter, a specific example of attaching the bag-shaped film body 20 to the sealing device 10 and a flow of sealing the bag-shaped film body 20 attached to the sealing device 10 will be described. FIGS. 6A-6E are a set of explanatory diagrams schematically describing a flow of sealing the bag-shaped film body 20 by the sealing device 10. For easy understanding of the description, only the bag-shaped film body 20, the moving member 12, the pushing members 14, and the clamping members 13 of the frame member 11 are schematically illustrated. The bag-shaped film body 20 is illustrated in a state in which the plate member 22 is viewed in a plan view, and the first foldable portion B1, the second foldable portion B2, the third foldable portion B3, the fourth foldable portion B4, the fifth foldable portion B5, the sixth foldable portion B6, the second plate auxiliary foldable portion C2, and the fifth plate auxiliary foldable portion C5 are each indicated by a black dot.

Figure 6A:
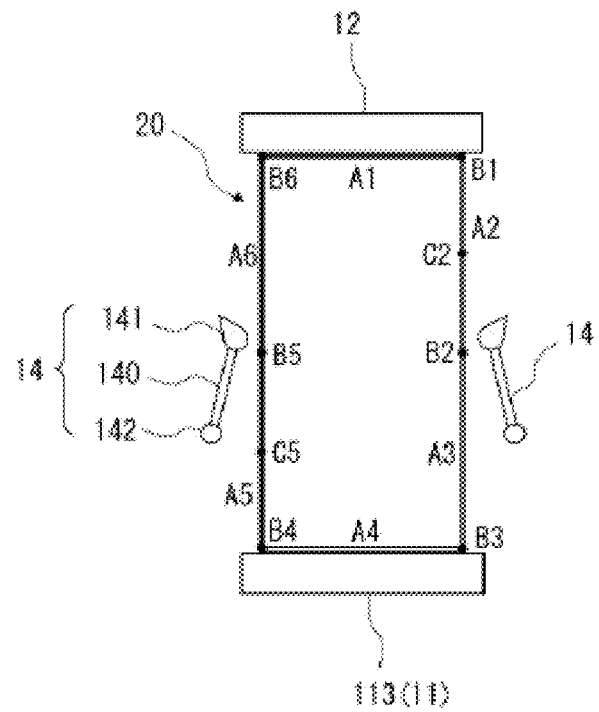
FIGS. 6A-6E are a set of explanatory diagrams schematically describing a flow of sealing the bag-shaped film body by the sealing device.

The user of the toilet apparatus 1 attaches the bag-shaped film body 20 to the sealing device 10 of the toilet apparatus 1. The first plate portion A1 of the plate member 22 of the bag-shaped film body 20 is attached (as the first portion) to the clip members 120 (attaching portion) of the moving member 12, and the fourth plate portion A4 is attached (as the second portion) to the clamping members 113 (engaging portion) of the frame member 11. FIG. 6A schematically illustrates a state in which the bag-shaped film body 20 is attached to the sealing device 10.

After the waste and the like are contained in the bag-shaped film body 20 by the user, the user grasps the grip portion 130 of the handle member 13 by hand and pulls out the handle member 13 frontward from the frame member 11. The moving member 12 is coupled to the handle member 13, and therefore, by pulling out the handle member 13, the moving member 12 moves frontward (in a direction toward the clamping members 113 provided on the frame member 11). As the moving member 12 moves frontward, the first plate portion A1 attached to the clip members 120 of the moving member 12 moves toward the fourth plate portion A4 attached to the clamping members 113 of the frame member 11. At this time, the pushing portions 141 of the pair of right and left pushing members 14 move toward the center of the opening portion 111 in conjunction with the movement of the moving member 12.

As previously described, the plate member 22 is provided around the end edge portion 211 of the opening 210 of the bag-shaped film body 20, and the plate member 22 has the first plate portion A1, the second plate portion A2, the third plate member 22, the fourth plate portion A4, the fifth plate portion A5, and the sixth plate portion A6 in this order and further has 6 foldable portions (the first foldable portion B1, the second foldable portion B2, the third foldable portion B3, the fourth foldable portion B4, the fifth foldable portion B5, and the sixth foldable B6) between the first to sixth plate portions A1 to A6. The first foldable portion B1, the third foldable portion B3, the fourth foldable portion B4, and the sixth foldable portion B6 are formed by paper creasing so as to be easily folded outward the opening 210, and the second foldable portion B2 and the fifth foldable portion B5 are formed by paper creasing so as to be easily folded inward the opening 210.

Figure 6B:
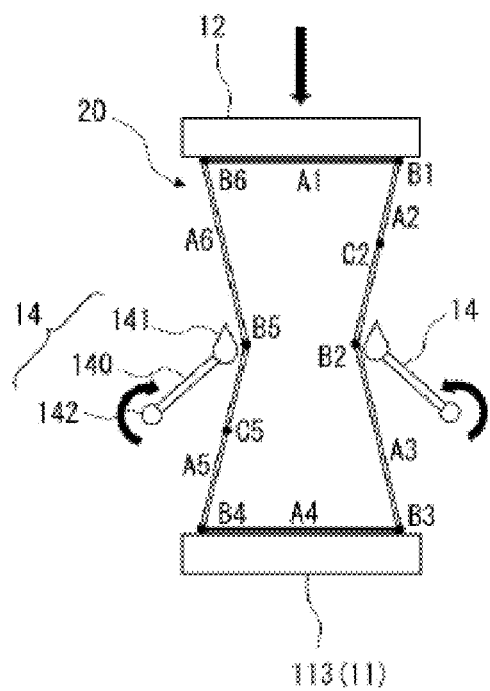

The plate member 22 of the bag-shaped film body 20 is configured in this way; therefore, when the pushing portions 141 of the pair of right and left pushing members 14 move toward the center of the opening portion 111, as illustrated in FIG. 6B, the pushing member 14 on the right side pushes leftward the vicinity of the coupling portion (i.e., the second foldable portion B2) between the second plate portion A2 and the third plate portion A3 while the pushing member 14 on the left side pushes rightward the vicinity of the coupling portion (i.e., the fifth foldable portion B5) between the fifth plate portion A5 and the sixth plate portion A6, and the second foldable portion B2 and the fifth foldable portion B5 are folded inward the opening 210.

When the user continues to further pull out the handle member 13, the moving member 12 moves further frontward, so that the first plate portion A1 moves closer to the fourth plate portion A4, and the second plate portion A2, the third plate portion A3, the fifth plate portion A5, and the sixth plate portion A6 are folded between the first plate portion A1 and the fourth plate portion A4. When the second plate portion A2 and the third plate portion A3 folded from the right side and the fifth plate portion A5 and the sixth plate portion A6 folded from the left side start to interfere with each other, the second plate auxiliary foldable portion C2 formed near the center of the second plate portion A2 and the fifth plate auxiliary foldable portion C5 formed near the center of the fifth plate portion A5 are folded outward the opening 210 thereby to allow the third plate portion A3 and the sixth plate portion A6 to smoothly overlap each other, and the state as illustrated in FIG. 6C is obtained.

Figure 6C:
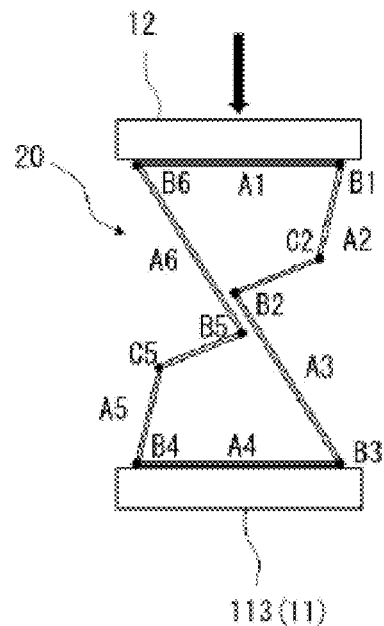
Figure 6D:
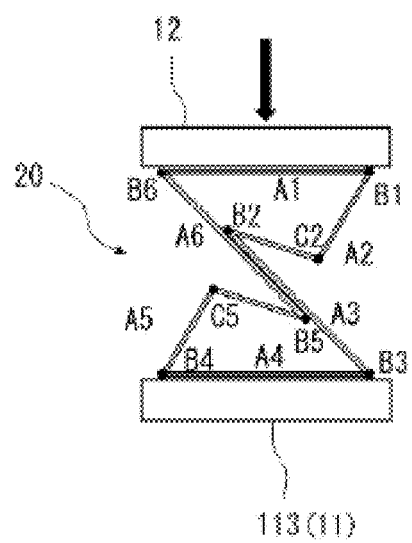
Figure 6E:
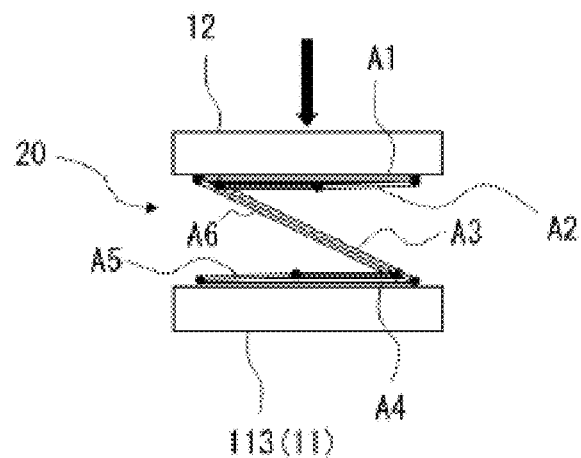

When the handle member 13 is further pulled out from the state of FIG. 6C and the moving member 12 is further moved frontward, the first plate portion A1 approaches the fourth plate portion A4 thereby to allow the plate member 22 to be folded in an approximately inverted Z shape in a plan view, as illustrated in FIGS. 6D and 6E, and when the rod portions 1311 of the handle member 13 are finally pulled out from the frame member 11, the plate member 22 is folded so that the second plate portion A2, the third plate portion A3, the sixth plate portion A6, and the fifth plate portion A5 overlap in order from the first plate portion A1 side between the first plate portion A1 and the fourth plate portion A4, and a state is obtained in which the folded bag-shaped film body 20 is clamped between the heater unit 114 and the heater receiving portion 121. When, in this state, the user raises the handle member 13 upward by 90 degrees (i.e., the user tilts the rod portions 1311 to the positions at which the rod portions 1311 are raised 90 degrees with respect to the base end portions 1312 in a state in which the rod portions 1311 are pulled out from the insertion portions 115), the heater unit 114 comes to a heating state, and the opening 210 of the bag-shaped film body 20 is sealed.

While the sealing device and bag-shaped film body according to the present invention have been described hereinbefore based on the drawings, the present invention is not limited to the above embodiments, and various modifications are possible. For example, in the present embodiment, the sealing device 10 is applied to the toilet apparatus 1, and the waste contained in the bag-shaped film body 20 is assumed to be excrement in the toilet, but the present invention is not limited to this, and the sealing device 10 may be applied to a waste disposal device for used diapers or may also be applied to a swill disposal processing device or the like. Moreover, in the above embodiments, the bag-shaped film body 20 including the plate member 22 is attached to the sealing device 10 and used, but the present invention is not limited to this, and a bag-shaped film body such as a commercially available vinyl bag may be used as a sealing object of the sealing device 10, or the bag-shaped film body 20 including the plate member 22 may be used as a sealing object in a sealing device having a configuration different from the sealing device 10.

Furthermore, in the above embodiments, the plate portions constituting the plate member 22 are arranged clockwise in the order of the first plate portion A1, the second plate portion A2, the third plate portion A3, the fourth plate portion A4, the fifth plate portion A5, and the sixth plate portion A6, and the foldable portions constituting the plate member 22 are arranged clockwise in the order of the first foldable portion B1, the second foldable portion B2, the third foldable portion B3, the fourth foldable portion, the fifth foldable portion B5, and the sixth foldable portion B6, but they may be configured as the first, second, . . . , and so on in the counterclockwise direction. In this case, the plate member 22 is folded in an approximately Z shape in a plan view, but finally, as in the case of being folded in an approximately inverted Z shape, the plate member 22 is folded so that the second plate portion A2, the third plate portion A3, the sixth plate portion A6, and the fifth plate portion A5 overlap in order from the first plate portion A1 side between the first plate portion A1 and the fourth plate portion A4.

DESCRIPTION OF REFERENCE NUMERALS

10 Sealing device
  11 Frame member
    110 Frame bottom
    111 Opening portion
    112 Side wall portion
      112a Front side wall portion
    113 Clamping member (engaging portion)
      1131, 1132 Plate-shaped portion
      1133 Engaging groove
    114 Heater unit
    115 Insertion portion
    116 Support portion
    117 Guide wall
  12 Moving member
    120 Clip member (attaching portion)
      1201 Base portion
      1202 Movable plate portion
    121 Heater receiving portion
    122 Bottom portion
    123 Air evacuation member
      1231 Contact surface
      1232 Flat plate member
      1233 Semi-cylindrical contact member
  13 Handle member
    130 Grip portion
    131 Rod-shaped member(s)
      1311 Rod portion
      1312 Base end portion
  14 Pushing member
    140 Shaft portion
    141 Pushing portion
    142 Shaft support portion
    143 Shaft member
  15 Heater receiving portion guide plate
  16 Heater unit guide plate
20 Bag-shaped film body
  21 Bag main body
    210 Opening
    211 End edge portion
  22 Plate member
    A1 First plate portion
    A2 Second plate portion
    A3 Third plate portion
    A4 Fourth plate portion
    A5 Fifth plate portion
    A6 Sixth plate portion
    B1 First foldable portion
    B2 Second foldable portion
    B3 Third foldable portion
    B4 Fourth foldable portion
    B5 Fifth foldable portion
    B6 Sixth foldable portion
    C2 Second plate auxiliary foldable portion
    C5 Fifth plate auxiliary foldable portion
30 Pedestal
40 Toilet seat
1 Toilet apparatus

The invention claimed is:

1. A sealing device that seals an opening of a bag-shaped film body, the sealing device comprising:
  a frame member having an opening portion through which the bag-shaped film body is inserted, an engaging portion with which a first portion of the bag-shaped film body at an end edge portion of the opening is engaged, and a heater unit provided in a vicinity of the engaging portion;
  a moving member having an attaching portion to which a second portion of the bag-shaped film body at a position opposing to the first portion at the end edge portion of the opening is attached and a heater receiving portion provided in a vicinity of the attaching portion; and
  a handle member that is slidably inserted in the frame member and coupled to the moving member, wherein
  the handle member comprises a pair of right and left rod-shaped portions arranged in parallel and a grip portion provided astride between end portions of the pair of right and left rod-shaped portions,
  the pair of right and left rod-shaped portions are slidably inserted in a pair of insertion portions provided on right and left of the opening portion of the frame member,
  each of the pair of right and left rod-shaped portions has a rod portion connected to the grip portion and a base end portion coupled to the moving member,
  the rod portion is axially attached to the base end portion so as to be movable in a tilting manner,
  the moving member is arranged so as to be movable in the opening portion toward the engaging portion,
  the heater unit and the heater receiving portion are configured to clamp the bag-shaped film body and heat and seal it in a state in which the moving member is moved to the vicinity of the engaging portion by the handle member, and
  the heater unit is configured to come to a heating state when the rod portion is tilted to a predetermined position with respect to the base end portion in a state of being pulled out from each of the insertion portions.

2. The sealing device according to claim 1, comprising a pair of right and left pushing members that push, toward a center of the opening portion, a third portion and a fourth portion between the first portion and the second portion of the bag-shaped film body at the end edge portion of the opening in conjunction with movement of the moving member toward the engaging portion.

3. The sealing device according to claim 1, wherein an air evacuation member having a contact surface that comes into contact with the bag-shaped film body is suspended from the moving member.

4. The sealing device according to claim 3, wherein the contact surface has a convex shape protruding toward the engaging portion.

5. A sealing device that seals an opening of a bag-shaped film body, the sealing device comprising:
  a frame member having an opening portion through which the bag-shaped film body is inserted, an engaging portion with which a first portion of the bag-shaped film body at an end edge portion of the opening is engaged, and a heater unit provided in a vicinity of the engaging portion;

a moving member having an attaching portion to which a second portion of the bag-shaped film body at a position opposing to the first portion at the end edge portion of the opening is attached and a heater receiving portion provided in a vicinity of the attaching portion; and a handle member that is slidably inserted in the frame member and coupled to the moving member, wherein the moving member is arranged so as to be movable in the opening portion toward the engaging portion, and the heater unit and the heater receiving portion are configured to clamp the bag-shaped film body and heat and seal it in a state in which the moving member is moved to the vicinity of the engaging portion by the handle member, wherein an air evacuation member having a contact surface that comes into contact with the bag-shaped film body is suspended from the moving member, and wherein the air evacuation member is swingably suspended from the moving member so as not to restrict movement of the moving member toward the engaging portion.

6. A sealing device that seals an opening of a bag-shaped film body, the sealing device comprising:

a frame member having an opening portion through which the bag-shaped film body is inserted, an engaging portion with which a first portion of the bag-shaped film body at an end edge portion of the opening is engaged, and a heater unit provided in a vicinity of the engaging portion;

a moving member having an attaching portion to which a second portion of the bag-shaped film body at a position opposing to the first portion at the end edge portion of the opening is attached and a heater receiving portion provided in a vicinity of the attaching portion; and a handle member that is slidably inserted in the frame member and coupled to the moving member, wherein the moving member is arranged so as to be movable in the opening portion toward the engaging portion, and the heater unit and the heater receiving portion are configured to clamp the bag-shaped film body and heat and seal it in a state in which the moving member is moved to the vicinity of the engaging portion by the handle member, wherein heater receiving portion guide plates are provided below both end portions of the heater receiving portion so as to guide the bag-shaped film body from the both end portions of the heater receiving portion toward a central portion of the heater receiving portion, and/or heater unit guide plates are provided below both end portions of the heater unit so as to guide the bag-shaped film body from the both end portions of the heater unit toward a central portion of the heater unit.

* * * * *